United States Patent [19]

Borzym

[11] Patent Number: 4,635,514
[45] Date of Patent: Jan. 13, 1987

[54] ELLIPTICAL SHEARING APPARATUS

[76] Inventor: Alexander Borzym, 7469 Pebble Point Dr., West Bloomfield, Mich. 48033

[21] Appl. No.: 729,928

[22] Filed: May 3, 1985

[51] Int. Cl.⁴ .............................................. B26D 3/16
[52] U.S. Cl. ......................................... 83/196; 83/186
[58] Field of Search .......................... 83/186, 196, 199; 82/54, 58

[56] References Cited

U.S. PATENT DOCUMENTS

| | | | |
|---|---|---|---|
| 1,216,426 | 2/1917 | Erickson | 83/199 |
| 2,435,469 | 2/1948 | Roop | 83/186 |
| 2,990,742 | 7/1961 | Jackson | 83/186 |
| 3,998,117 | 12/1976 | Fujibayashi | 83/199 |
| 4,003,278 | 1/1977 | Shields | 83/186 |
| 4,003,279 | 1/1977 | Carmichael et al. | 83/199 |
| 4,343,208 | 8/1982 | Basily et al. | 83/196 X |

Primary Examiner—Frank T. Yost
Attorney, Agent, or Firm—Krass & Young

[57] ABSTRACT

A shearing apparatus for bar stock comprising a fixed die and a movable die wherein the movable die comprises a shearing ring carried by an arm at a location intermediate the ends of the arm, an eccentric fixed on a driven shaft is journalled in one end of the arm, and the other end of the arm includes a slot which receives a rotationally mounted slide block so that the slot and slide block coact to accommodate combined rotary and translatory movement of that end of the arm. The described arrangement produces an elliptical loop movement of the movable die relative to the fixed die to cleanly shear the stock. Also disclosed is a novel mandrel assembly including a pair of plug members adapted to be positioned within tubular stock to be cut wherein one of the plug members is mounted for selective radial excursion during the shearing operation to accommodate the eccentric movement of the movable die.

5 Claims, 14 Drawing Figures

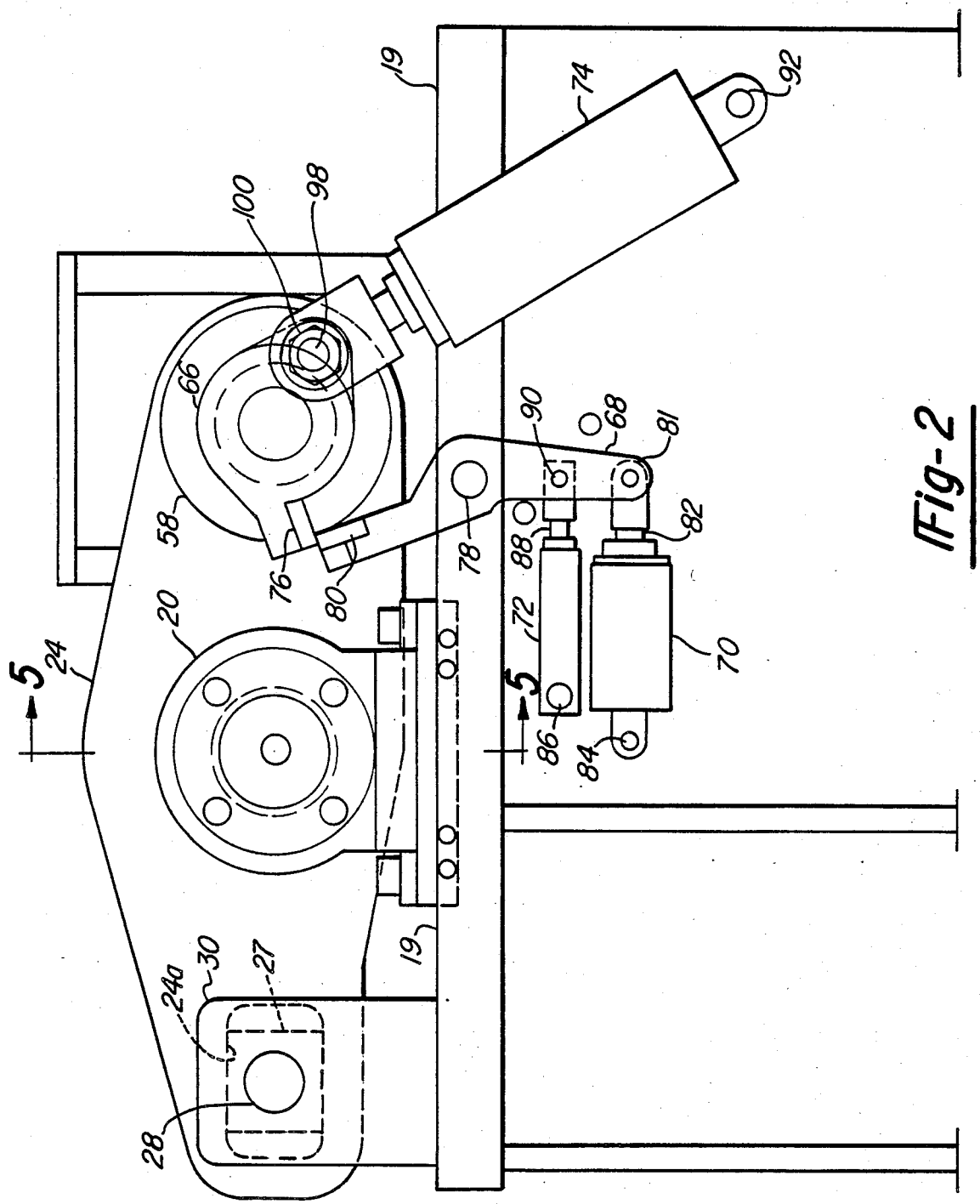

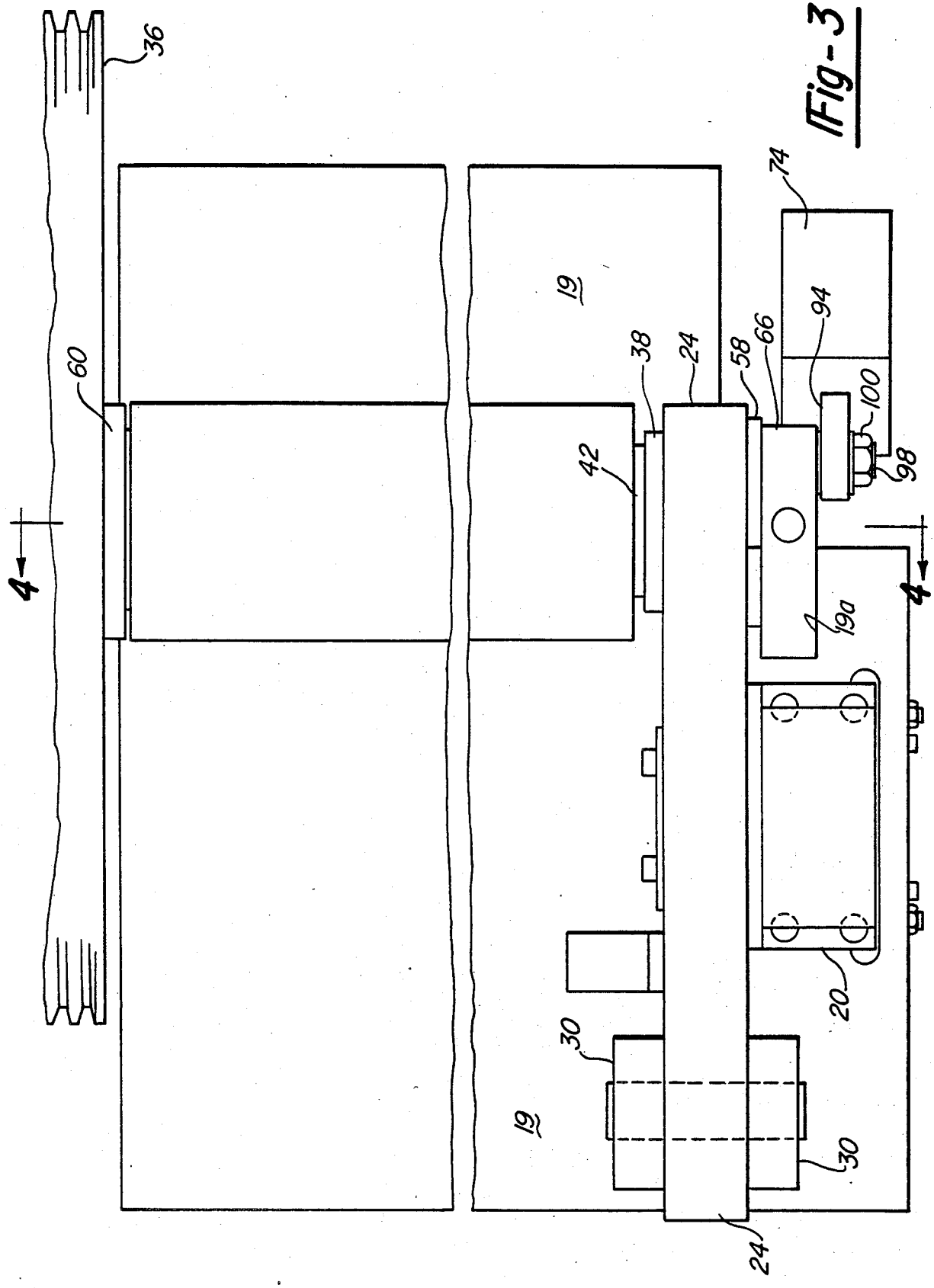

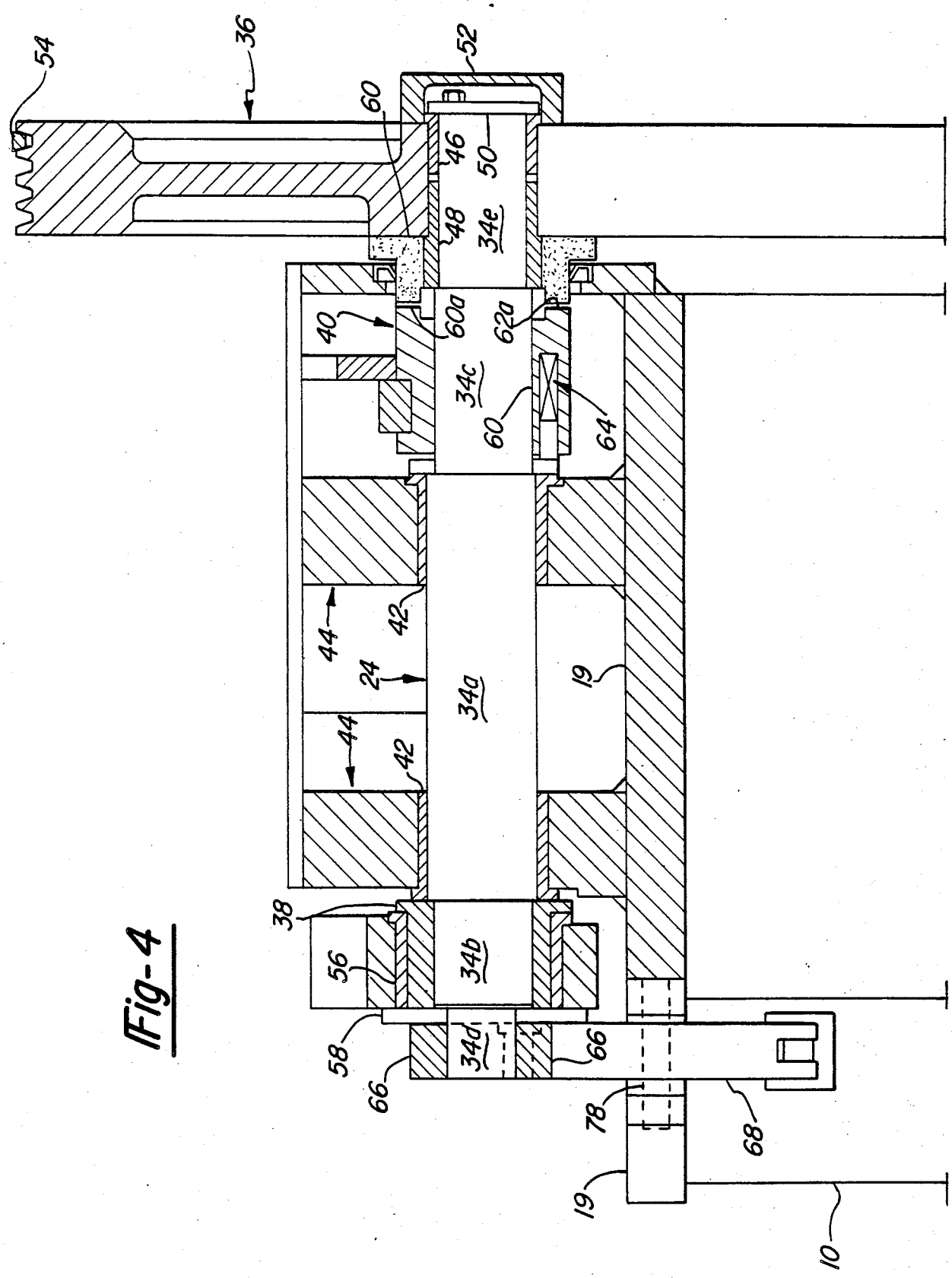

180°

45°

225°

90°

270°

135°

315°

ELLIPTICAL SHEARING APPARATUS

TECHNICAL FIELD

This invention relates to shearing apparatus for cutting relatively short lengths of bars from round bar stock.

BACKGROUND ART

Many attempts have been made over the years to produce cutting apparatus that could effectively cut relatively long lengths of bar stock into desired shorter lengths. One approach has involved the use of a cutting or pinch roll operating on the same principle as the pipe cutter utilized by plumbers. Another approach has involved the use of a screw machine in which a stationary knife bears against a bar that is rotated. Another approach has involved the use of two aperture dies, initially aligned, one of which is displaced relative to the other at right angles to the axis of the stock to shear the bar. Another approach has involved the use of a screw type machine in which the bar stock is maintained stationary and the knifes are rotated to cut the bar. All of these prior art devices have suffered from one or more disadvantages. Specifically, either the apparatus required to perform the required cutting action has been unduly complicated or expensive, or the cut produced by the apparatus has been unsatisfactory in the sense of either leaving a burr on the cut length of bar or producing distortion of the cut edges.

SUMMARY OF THE INVENTION

The present invention is directed to the provision of a bar shearing apparatus which is extremely simple in construction and which yet produces a clean and accurate cut which is devoid of burrs and devoid of distortion of the cut ends.

The shearing apparatus of the invention includes a fixed die defining a first die aperture to receive stock to be cut and a movable die defining a second die aperture having a size and shape generally corresponding to that of the first die aperture and having a neutral position in which its center is coaxial with the axis of the first die aperture to allow stock to be cut to be inserted through the first and second die openings. According to the invention, means are provided to move the movable die in a manner to move the center of the second die aperture in a closed elliptical loop path passing through the axis of the fixed die aperture to thereby shear the inserted stock at the interface of the fixed and movable dies. This movement produces a clean and accurate cut of the stock and returns the dies after each cutting action to a position where they are ready for insertion of further stock to perform another cutting action.

According to a further aspect of the invention, the movable and fixed dies comprise first and second shearing rings which define the die apertures and the means for moving the movable die comprise an arm carrying the second shearing ring at a location intermediate the ends of the arm, a driven shaft, an eccentric fixed on the driven shaft and journaled in one end of the arm, and means mounting the other end of the arm for combined rotary and translatory movement. This arrangement provides a simple and effective means of producing the required elliptical loop movement of the second die relative to the first die. In the disclosed embodiment of the invention, the end of the mounting arm remote from the eccentric includes a slot which receives a rotationally mounted slide block so that the slot and slide block readily accommodate the required rotary and translatory movement of that end of the mounting arm.

According to a further aspect of the invention, applicable to cutting tubular stock, a mandrel assembly is provided which is adapted to be positioned inside of the tubular stock during the shearing operation and which functions to prevent distortion of the tubular stock during the shearing operation. The mandrel assembly of the invention includes a first plug member adapted to be positioned within the tubular stock within the first die aperture and a second plug member adapted to be positioned within the tubular stock within the second die aperture. Means are provided which normally bias the juxtaposed inboard faces of the plugs together at the interface of the dies but which allow the second plug to move relative to the first plug in response to the shearing action of the dies. In the disclosed embodiment of the invention, the mandrel assembly includes a rod member adapted to extend longitudinally within the tubular stock, a collar slidably mounted on the rod member outboard of the second plug member and having an annular cam face at its inboard end, and a spring engaging the outboard end of the collar and urging it in an inboard direction. The second plug is annular and includes an annular cam surface at its outboard end bearing against and coacting with the annular cam surface on the collar to allow selective axial excursion of the collar and radial excursion of the second plug in response to the shearing action of the dies.

BRIEF DESCRIPTION OF THE DRAWINGS

FIG. 2 is an elevational view on a large scale of a portion of the shearing apparatus of FIG. 1;

FIG. 3 is a plan view of the shearing apparatus of FIG. 2;

FIG. 4 is a cross sectional view taken on line 4—4 of FIG. 3;

DETAILED DESCRIPTION OF THE PREFERRED EMBODIMENT

Figure 5:
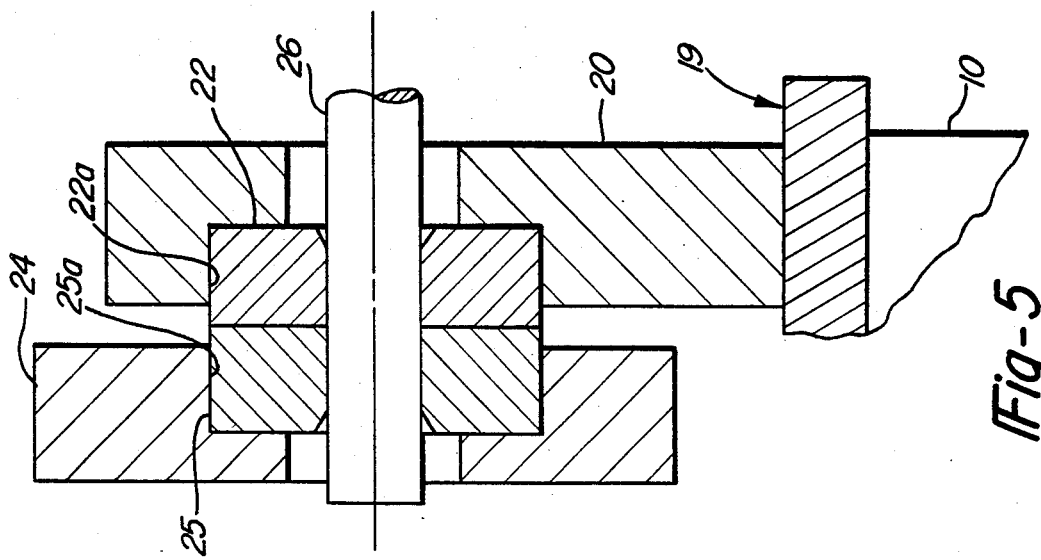
FIG. 5 is a cross sectional view taken on line 5—5 of FIG. 2.

The invention shearing apparatus, broadly considered, includes a base 10; a fixed die assembly 12; a movable die assembly 14; a drive mechanism 16; and a control mechanism 18.

Base 10 is of known form and includes a top 19 on which the various components of the invention shearing apparatus are mounted.

Fixed die assembly 12 includes a die holder 20 fixedly secured to top 19 and a shearing ring 22 carried by holder 20 and defining a circular die aperture 22a.

Figure 1:
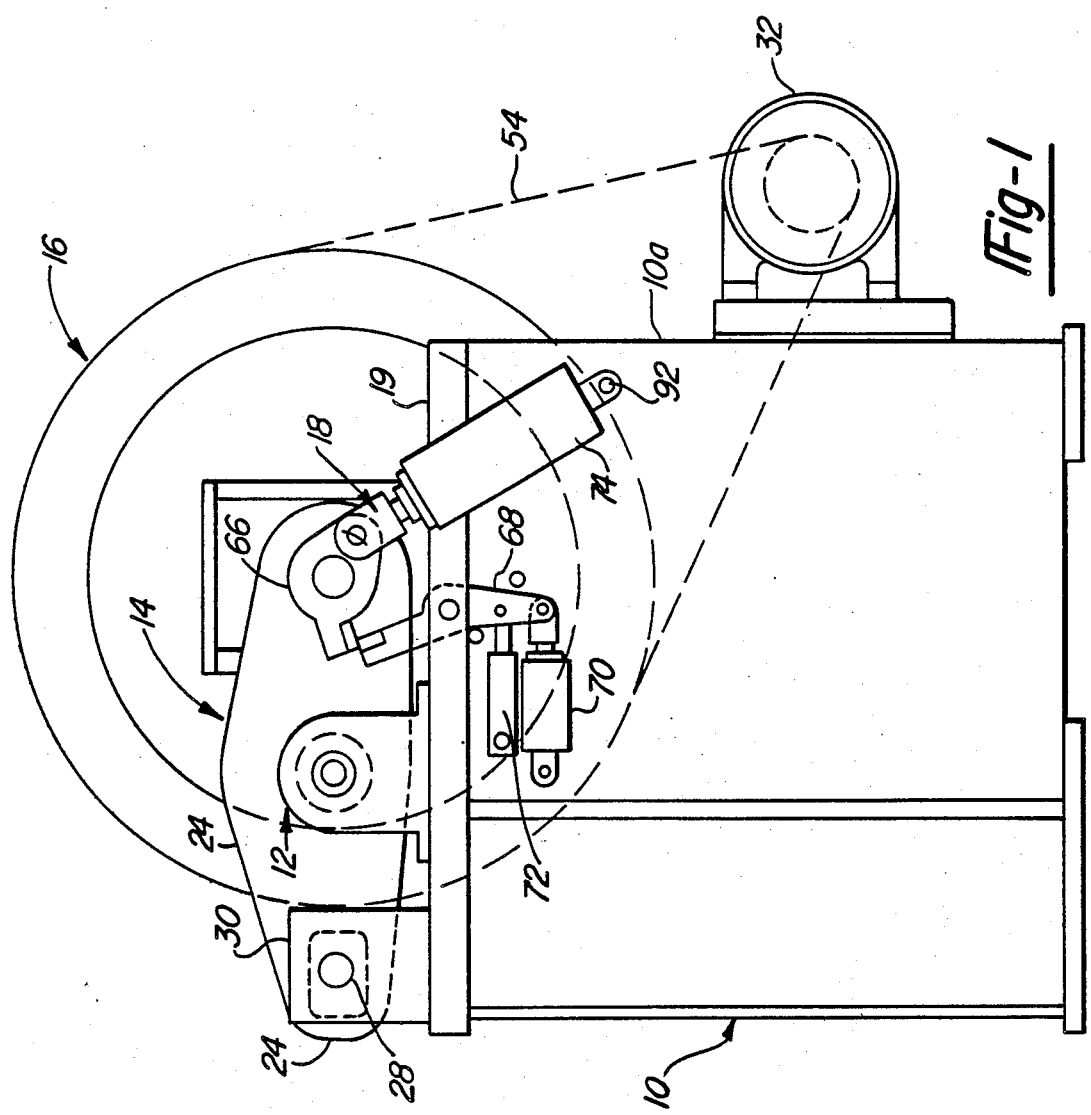
FIG. 1 is an overall perspective view of the invention shearing apparatus.
Figure 6A:
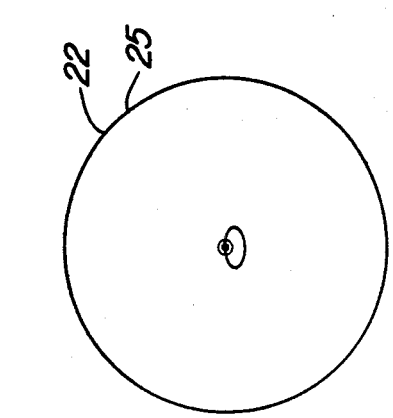
FIG. 6 is a sequential view showing successive steps in the invention shearing operation.
Figure 6E:
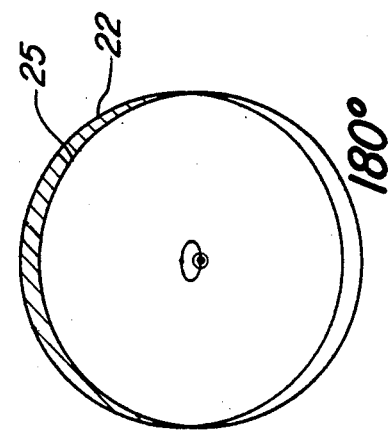
Figure 6B:
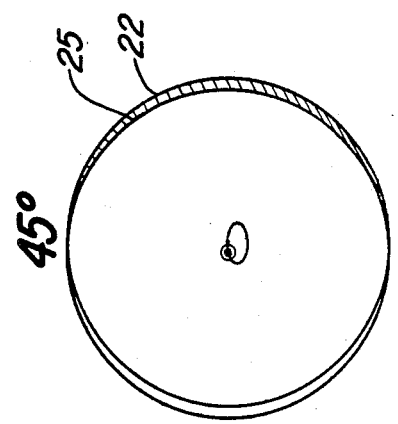
Figure 6F:
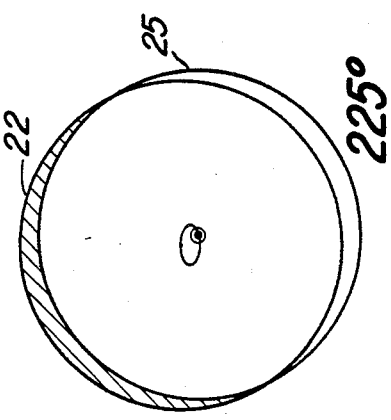
Figure 6C:
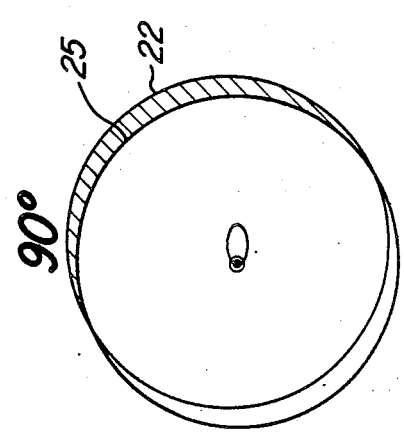
Figure 6G:
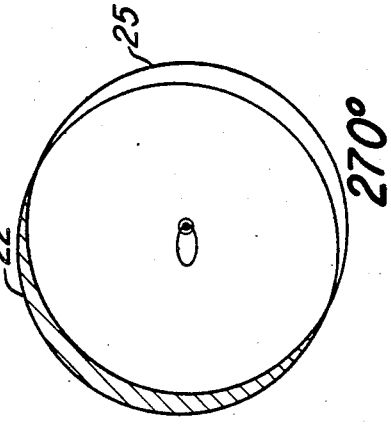
Figure 6D:
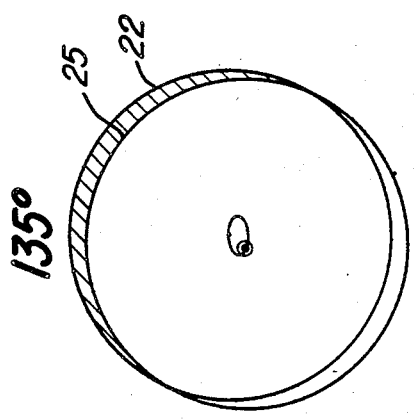
Figure 6H:
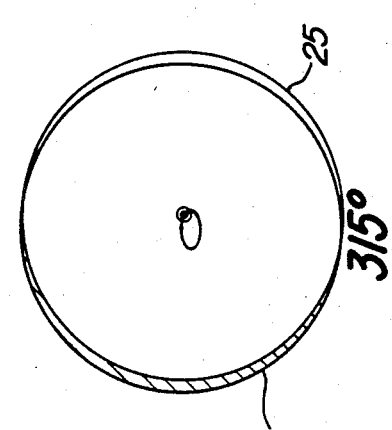

Movable die assembly 14 comprises a die holder 24 in the form of a generally horizontally disposed elongated arm and a shearing ring 25 carried by arm 24 at a location intermediate the ends of the arm and defining a die aperture 25a. Die aperture 25a is generally aligned with die aperture 22a for receipt of bar stock 26. The left end of movable die assembly arm 24, as viewed in FIGS. 1, 2 and 3, is mounted to base 10 by a slide block 27 mounted for sliding movement in a slot 24a provided in arm 24 and mounted for rotary movement by a pin 28 passing through the slide block and journaled at its opposite ends in spaced upstanding brackets 30 mounted on top 19.

Drive assembly 16 includes an electric motor 32 secured to side face 10a of base 10; a drive shaft 34; a flywheel 36; an eccentric 38; and a clutch assembly 40.

Drive shaft 34 includes a central portion 34a, reduced diameter portions 34b and 34c at the respective ends of central portion 34a, and further reduced diameter portions 34d and 34e at the respective ends of reduced diameter portions 34b and 34c. Central portion 34a is journaled by bearings 42 mounted in bearing brackets 44 upstanding from top 19 of base 10.

Flywheel 36 is journaled on reduced diameter portion 34e of drive shaft 34 by bearings 46 and 48. A thrust plate 50 is secured to the free end of shaft portion 34e to take the thrust loading of bearing 46 and an end cap 52 is centrally secured to flywheel 36 in a position covering thrust plate 28. The external periphery of flywheel 36 is in the form of a multi-sheave pulley which drivingly receives a plurality of belts 54 driven from the output pulley of motor 32.

Eccentric 38 is fixedly secured at its inner periphery to reduced diameter portion 34b of shaft 34 and is journaled at its outer periphery in a bearing 56 received in the right end of arm 24 as viewed in FIGS. 1, 2 and 3. A thrust plate 58 takes the thrust loading of bearing 56.

Clutch assembly 40 includes a first clutch member 60 secured to the inboard face of flywheel 36 and a second clutch member 62 splined on reduced diameter shaft portion 34c and having an annular clutching face 62a for clutching coaction with an annular clutching face 60a on clutch member 60. A plunger and spring assembly 64 bias clutch member 62 into clutching engagement with clutch member 60.

Control assembly 18 includes a bell crank 66; a further bell crank 68; an air cylinder 70; a damper 72; and a damper 74.

Bell crank 66 is fixedly secured intermediate its ends to reduced diameter shaft portion 34d and carries a wear resistant stop insert 76 at one end thereof. Bell crank 68 is mounted intermediate its ends on a pin 78 journaled in a slot 19a in the top 19 of base 10. A wear resistant stop insert 80 on the upper end of bell crank 68 coacts with insert 76, and the lower end of bell crank 68 is pivotally secured at 81 to the free end of the piston rod 82 of air cylinder 70. Air cylinder 70 is in turn pivotally mounted to base 10 at 84. Damper 72 is pivotally mounted on base 10 at 86 with the free end of its piston 88 pivotally mounted at 90 to bell crank 68 at a point intermediate pin 78 and pivotal connection 81. Damper 74 is pivotally mounted at its lower end at 92 to base 10 and includes a clevis 94 secured to the free end of its piston rod 96. Clevis 94 is pivotally secured by a bolt 98 and nut 100 to the end of bell crank 66 opposite stop insert 76.

Figure 7:
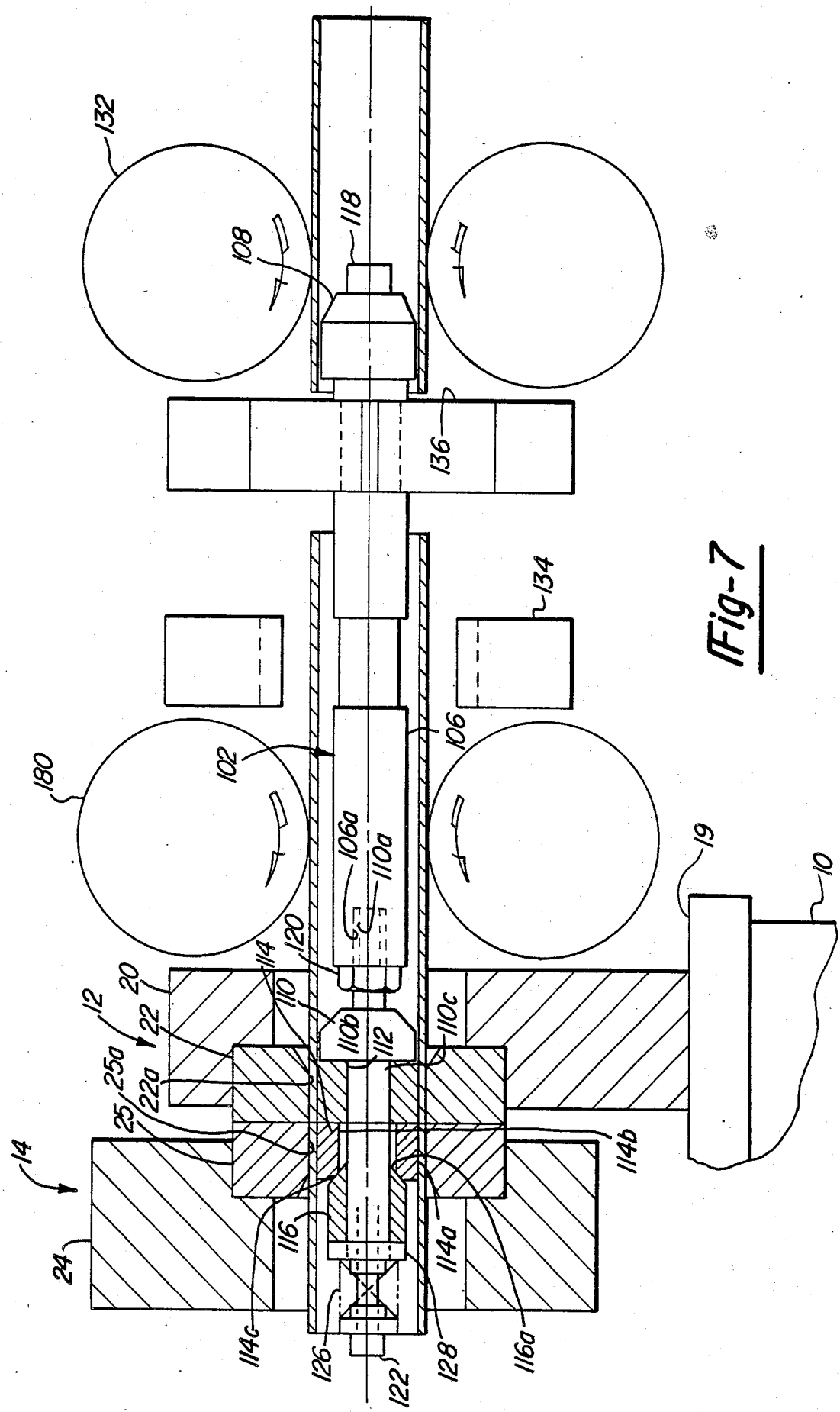
FIG. 7 is a view of a mandrel assembly especially suited for use with the invention shearing apparatus.

The invention shearing apparatus also includes a novel mandrel assembly 102 seen in FIG. 7. Mandrel assembly 102 is intended for use with tubular stock of the type seen at 104 in FIG. 7 and includes a rod 106, a tube guide plug 108, a mandrel 110, a first shearing plug 112, a second shearing plug 114, and a collar 116. Tube guide plug 108 is secured by a bolt 118 to one end of rod 106 and mandrel 110 is secured to the other end of rod 106 by a threaded portion 110a received in a threaded bore 106a in rod 106. A lock nut 120 maintains mandrel 110 in a position of threaded adjustment relative to rod 106. Mandrel 110 further includes a tube guide plug portion 110b and a rod portion 110c. Shearing plug 112 is journaled on rod portion 110c adjacent tube guide plug portion 110b and has an outer diameter 112a approximating the inner diameter 104a of the tubing to be cut. Shearing plug 114 is positioned on rod portion 110c outboard of shearing plug 112 has an outer diameter 114a equal to outer diameter 112a of plug 112 and an inner diameter 114b greater than the diameter of rod portion 110c. Collar member 116 is slidably and journally mounted on rod portion 110c outboard of shearing plug 114 and includes an annular cam face 116a at its inboard end for camming coaction with a cam face 114c on the outboard face of shearing plug 114. A bolt 122 is threaded into the free end of rod portion 110c and includes a washer 124. A spring 126 is positioned between washer 124 and a thrust washer 128 engaging the free end of collar 116 so that spring 126 biases cam faces 114c and 116a into engagement.

In operation, and with motor 32 operating at a steady speed to turn flywheel 36 at a steady speed with clutch assembly 40 slipping at the interface of annular clutch faces 60a, 62a, bar stock 26 is inserted through fixed die aperture 22a and through movable die aperture 25a and passes beyond the dies to a point corresponding to the desired length of bar to be cut. Air cylinder 70 is now actuated in a sense to withdraw insert 80 from stopping engagement with insert 76. Flywheel 36 is now free to drive shaft 34 through clutch members 60, 62 to allow the shaft and eccentric 38 carried thereby to move through one complete revolution, after which insert 76 again moves into engagement with insert 80 on bell crank 68 since the bell crank has been restored to its stop position by air cylinder 70 during the time required for bell crank 66 to complete its revolution. Dampers 72 and 74 function during this movement to cushion the movement of the total mechanism. As eccentric 38 is rotated by shaft 34 within arm 24 and as the left end of arm 24, as viewed in FIGS. 1-3, undergoes translatory and rotational movement as accommodated by slide block 27 and pin 28, the center of movable die aperture 25a, which is coaxial with the center of stationary die aperture 22a with stop inserts 76 and 80 engaged, is moved in a closed elliptical loop path passing through the axis of fixed aperture 22a to shear the inserted bar stock 26 at the interface of the fixed and movable dies.

The elliptical movement of the movable die aperture during the shearing operation is best seen in FIG. 6. In FIG. 6A, the dies are positioned coaxially and the cutting operation is about to begin. In FIG. 6B, shaft 34 has moved through 45° of rotation and the center of movable aperture 25a has begun its movement along its elliptical path relative to the center of the fixed aperture and has moved to the left and slightly downwardly of the center of the fixed aperture. In FIG. 6C, shaft 34 has moved through 90° of rotation and the center of the movable aperture has moved along its elliptical path to a position to the left and downwardly of the axis of the fixed aperture to a position on the extreme left end of the major axis of the ellipse. In FIG. 6D, shaft 34 has rotated through 135° and the center of the movable die has moved along its elliptical path back to the right but further downwardly with respect to the center of the fixed aperture. In FIG. 6E, shaft 34 has rotated through half a revolution and the center of the movable aperture has moved further to the right and downwardly relative to the center of the fixed aperture to a position immediately below the center of the fixed aperture on the bottom of the minor axis of the ellipse. In FIG. 6F, shaft 34 has moved through 225° of rotation and the center of the movable aperture has moved to the right of the center of the fixed aperture and has begun to move upwardly along the elliptical path. In FIG. 6G, shaft 34 has rotated through 270° of rotation and the center of the movable aperture has moved further to the right of the center of the fixed aperture to a point at the extreme right hand end of the major axis of the ellipse. In FIG. 6H, shaft 34 has moved through 315° of rotation and the center of the movable aperture has moved along its elliptical path upwardly and to the left back toward the center of the fixed aperture. As shaft 34 completes its 360° of revolution, to be terminated by engagement of stop inserts 80 and 76, the center of the movable aperture moves back along its elliptical path to a point of coincidence with the center of the fixed aperture. The bar stock has now been cleanly and totally sheared through and the fixed and movable shear rings are back in their coaxial position ready for another shearing cycle.

When the invention apparatus is used for cutting tubular stock, mandrel assembly 102 is inserted into tubing 104 to position the interface of shearing plugs 112 and 114 in the plane of the interface of shearing rings 22 and 25. The operation of mandrel assembly 102 during the shearing operation is best seen in FIG. 7. Shearing plug 112 maintains a firm, coaxial position within the tubular stock during the shearing operation. Shearing plug 114 however moves selectively during the shearing operation to accommodate the elliptical movement of the movable die aperture relative to the fixed die aperture. Specifically, movable shearing plug 114 follows the elliptical path of movable aperture 25a with cam surface 114c engaging collar cam surface 116a to selectively urge collar 116 axially along mandrel rod portion 110c against the urging of spring 126 to allow the elliptical excursion of plug 114 during the shearing operation. Tubular stock 104 is selectively fed to the shearing apparatus by a first pair of feed rolls 130 and a second pair of feed rolls 132. A pair of clamping jaws 134 engage the tubular stock during the shearing operation to prevent movement of the stock during the shearing operation, and a pair of clamping jaws 136 engage rod 106 of mandrel 102 during the cutting operation to preclude movement of the mandrel during the cutting operation.

The invention shearing apparatus will be seen to provide an extremely simple mechanism which is capable of producing a very clean cut at the interface of the dies. The cut is relatively free of burrs and distortions and provides relatively low residual stresses in the cut ends of the stock. The invention shearing apparatus is also very efficient since the apparatus is ready for another shearing operation at the conclusion of each shearing operation since the parts, at the conclusion of the shearing operation, have moved back into their initial position of coaxial alignment.

Whereas a preferred embodiment to the invention has been illustrated and described in detail in will be apparent that various changes may be made in the disclosed embodiment without departing from the scope or spirit of the invention.

What is claimed is:

1. A shearing apparatus comprising:
   (A) a fixed die comprising a first shearing ring defining a first die aperture to receive stock to be cut;
   (B) a movable die comprising a second shearing ring defining a second die aperture having a size and shape generally corresponding to that of said first die aperture and having a neutral position in which its center is coaxial with the axis of said first die aperture to allow stock to be cut to be inserted through said first and second die apertures; and
   (C) means for moving said movable die in a manner to move said center of said second die aperture in a closed elliptical path passing through said axis and thereby shear the inserted stock at the interface of said fixed immovable dies, said moving means comprising
      (1) an arm carrying said second shearing ring at a location intermediate the ends of the arm,
      (2) a driven shaft,
      (3) an eccentric fixed on said drive shaft and journalled in one end of said arm, and
      (4) means mounting the other end of said arm for combined rotary and translatory movement.

2. An apparatus according to claim 1 wherein:
   D. said mounting means comprises
      (1) a slot in said other end of said arm,
      (2) a slide block slidably positioned in said slot, and
      (3) means mounting said slide block for rotary movement about a fixed axis.

3. A shearing apparatus comprising:
   A. a fixed die defining a first die aperture operative to receive stock to be cut;
   B. an arm defining a second die aperture intermediate its ends adapted for coaction with said first die aperture to receive stock to be cut;
   C. means mounting one end of said arm for eccentric motion; and
   D. means mounting the other end of said arm for combined rotary and translatory motion.

4. A shearing apparatus according to claim 3 wherein:
   E. the means mounting said one end of said arm for eccentric motion comprises a driven shaft and an eccentric fixed on said drive shaft and journalled in said one end of said arm.

5. A shearing apparatus according to claim 4 wherein:
   F. the means mounting the other end of said arm for combined rotary and translatory movement comprises a slot in said other end of said arm, a slide block slideably positioned in said slot, and means mounting said slide block for rotary movement about a fixed axis.

* * * * *